(12) United States Patent
Clarke (10) Patent No.: US 7,201,003 B2
(45) Date of Patent: Apr. 10, 2007

(54) MAGNET VENT ASSEMBLY APPARATUS

(75) Inventor: Neil Clarke, Oxford (GB)

(73) Assignee: General Electric Company, Schenectady, NY (US)

( * ) Notice: Subject to any disclaimer, the term of this patent is extended or adjusted under 35 U.S.C. 154(b) by 356 days.

(21) Appl. No.: 10/708,558

(22) Filed: Mar. 11, 2004

(65) Prior Publication Data

US 2005/0198973 A1    Sep. 15, 2005

(51) Int. Cl.
| | |
|---|---|
| F25B 19/00 | (2006.01) |
| F16K 17/14 | (2006.01) |
| F16K 17/40 | (2006.01) |
| F16K 43/00 | (2006.01) |
| F16L 37/56 | (2006.01) |

(52) U.S. Cl. .................. 62/51.1; 137/68.23; 137/329.1; 137/594

(58) Field of Classification Search ............. 62/51.1; 137/67, 68.23, 68.14, 329.1, 594

See application file for complete search history.

(56) References Cited

U.S. PATENT DOCUMENTS

| | | | | |
|---|---|---|---|---|
| 2,574,139 A | * | 11/1951 | Barton | 220/89.2 |
| 4,247,311 A | * | 1/1981 | Seibert et al. | 96/111 |
| 4,372,334 A | * | 2/1983 | Paul, Jr. | 137/12 |
| 5,141,012 A | * | 8/1992 | Gavrila | 137/15.18 |
| 5,291,739 A | * | 3/1994 | Woods et al. | 62/48.1 |
| 5,819,683 A | * | 10/1998 | Ikeda et al. | 118/724 |
| 6,591,854 B1 | * | 7/2003 | Turner et al. | 137/68.23 |

* cited by examiner

*Primary Examiner*—Willaim C. Doerrler
(74) *Attorney, Agent, or Firm*—Cantor Colburn LLP (57) ABSTRACT

A magnet vent assembly for venting a cryogenic gas from a superconducting magnet of an MRI system. The assembly comprises: a first burst disc, the first burst disc comprising a first inlet and a first outlet; a second burst disc, the second burst disc comprising a second inlet coupled to the first inlet and a second outlet coupled to the first outlet; and wherein the magnet vent assembly is configured to switchably direct a flow path of cryogenic gas through either of the following: the first burst disc and the second burst disc. A service tool for a magnet vent assembly for venting a cryogenic gas from a superconducting magnet of an MRI system. The magnet vent assembly comprises a first burst disc. The service tool comprises: an inlet end, configured to be removeably attachable to an inlet flange of a magnet vent assembly; an outlet end, configured to be removeably attachable to an outlet flange of a magnet vent assembly; a second burst disc in operable communication with the inlet end and outlet end; and the service tool is configured to switchably direct a flow path of cryogenic gas through either of the following: the first burst disc and the second

23 Claims, 8 Drawing Sheets

MAGNET VENT ASSEMBLY APPARATUS

BACKGROUND OF INVENTION

The present invention relates generally to superconducting magnets, and more particularly to an assembly for venting cryogenic gases away from a superconducting magnet when gas pressure builds to a potentially dangerous level due to magnet quench or reversion to a non-superconductive state.

It is well known that magnets can be made superconductive by enclosing them within a pressure vessel, or cryostat, which contains a reservoir of liquid helium or some other cryogenic liquid. The extreme cold reduces the resistance in the coils of the magnet such that when a power source is initially connected to the coil to introduce a current flow through the coils, the current will continue to flow through the coils due to the negligible resistance even after power is removed, thereby maintaining a magnetic field. Superconducting magnets find wide application, for example, in the field of magnetic resonance imaging ("MRI").

Figure 1:
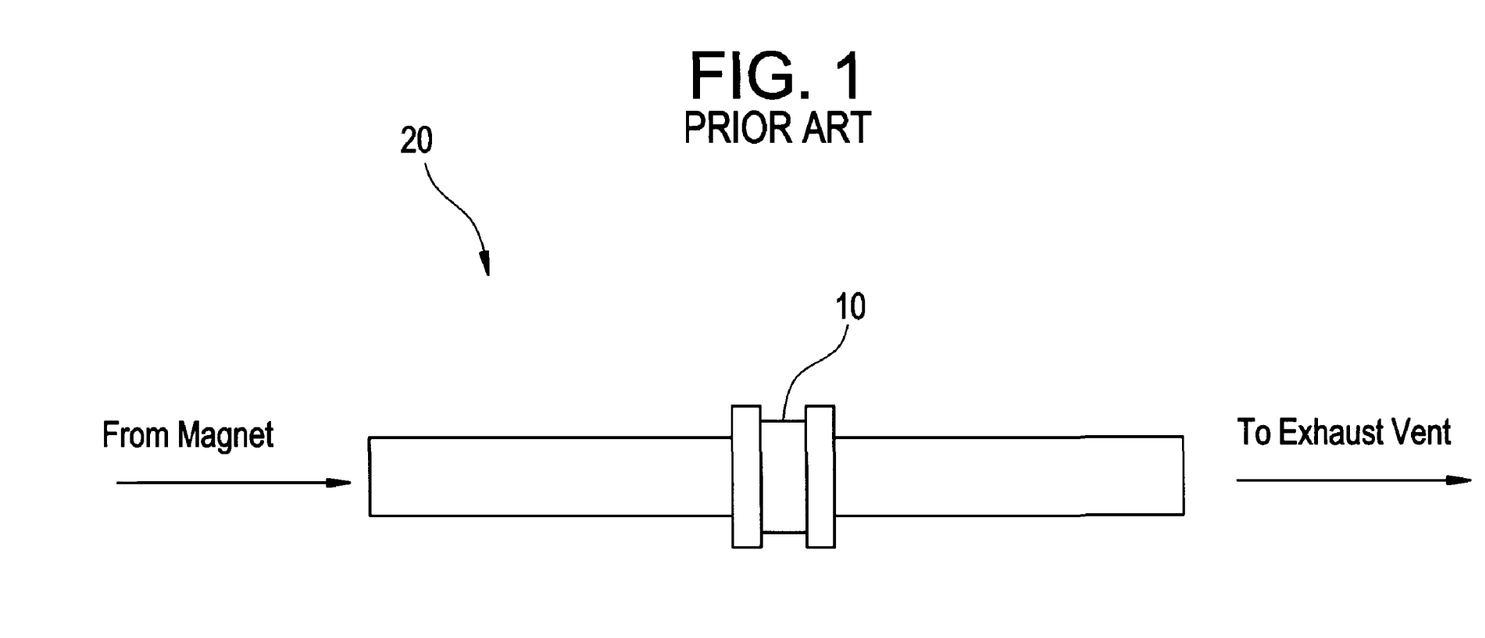
FIG. 1 is a schematic representation of a known magnet vent assembly.

During normal superconducting operation of the magnet, the cryostat must be a sealed or closed system for reasons including, but not limited to: preventing leakage of helium gas or other cryogenic gas from the cryostat; preventing depletion of liquid helium or other cryogenic liquid from the reservoir; and preventing the ingress of air which will freeze at the low temperatures inside the vessel. In the event of an undesired magnet quench, a reversion of the magnet to a non-superconductive state, or a loss of the insulating vacuum in the cryostat, a rapid and potentially dangerous helium gas high pressure buildup in the cryostat will occur. Such a pressure buildup requires pressure relief through rapid venting of the gas to the atmosphere outside the superconducting magnet. Referring to FIG. 1, a replaceable burst disc 10 may be interposed within a magnet vent assembly 20, which disc 10 is designed to rupture at a predetermined pressure thereby opening the cryostat to an atmospheric vent.

The burst disc may require replacement for a variety of reasons, including, but not limited to: a burst disk rupture, damage due to a liquid helium transfer, or preventative maintenance. Ideally a burst disc would be replaced when the magnet is still energized, as considerable time and expense is involved in de-energisation. A service engineer must replace the burst disc. If the magnet is energized and a magnet quench occurs during the replacement of the burst disc, the service engineer would be exposed to cold helium gas in the confined space of an MRI imaging room, or in a vehicle compartment of a portable MRI system. This gas will displace oxygen from the room giving a risk of asphyxiation and may cause cold burns. Therefore, a service engineer may be required to wear bulky protective gear to protect against exposure to cryogenic gas.

It is desirable to replace a burst disc while the magnet is energized. It is also desirable to prevent the possible release of a cryogenic gas in an MRI imaging room or a vehicle compartment of a portable MRI system during a replacement of a burst disc.

SUMMARY OF INVENTION

The disclosed apparatus relates to a magnet vent assembly for venting a cryogenic gas from a superconducting magnet of an MRI system. The assembly comprises: a first burst disc, the first burst disc comprising a first inlet and a first outlet; a second burst disc, the second burst disc comprising a second inlet coupled to the first inlet and a second outlet coupled to the first outlet; and wherein the magnet vent assembly is configured to switchably direct a flow path of cryogenic gas through either of the following: the first burst disc and the second burst disc.

The disclosed apparatus also relates to a magnet vent assembly for venting a cryogenic gas from a superconducting magnet of an MRI system. The assembly comprises: a first burst disc, the first burst disc comprising a first inlet and a first outlet; the first inlet comprising an inlet valve; the first outlet comprising an outlet valve; an inlet flange in operable communication with the first inlet; an outlet flange in operable communication with the first outlet; and wherein the magnet vent assembly is configured for a removable attachment by a service tool, the service tool comprising a second burst disc, and the inlet valve and outlet valve are configured to switchably direct a flow path of cryogenic gas through either of the following: the first burst disc and the second burst disc.

In addition, the disclosed apparatus relates to a service tool for a magnet vent assembly for venting a cryogenic gas from a superconducting magnet of an MRI system. The magnet vent assembly comprises a first burst disc. The service tool comprises: an inlet end, configured to be removeably attachable to an inlet flange of a magnet vent assembly; an outlet end, configured to be removeably attachable to an outlet flange of a magnet vent assembly; a second burst disc in operable communication with the inlet end and outlet end; and the service tool is configured to switchably direct a flow path of cryogenic gas through either of the following: the first burst disc and the second burst disc.

The disclosed apparatus additionally relates to an MRI system comprising: a cryostat; a superconducting magnet located in the cryostat; a first burst disc, the first burst disc comprising a first inlet and a first outlet, and the first inlet is in fluid communication with the cryostat; a second burst disc, the second burst disc comprising a second inlet coupled to the first inlet and a second outlet coupled to the first outlet, and the second inlet is in fluid communication with the cryostat; a vent in fluid communication with the first outlet and the second outlet; and wherein the MRI system is configured to switchably direct a flow path of cryogenic gas through either of the following: the first burst disc and the second burst disc.

BRIEF DESCRIPTION OF DRAWINGS

Referring to the exemplary drawings wherein like elements are numbered alike in the several Figures:

FIG. 6 is a schematic representation of a disclosed magnet vent assembly;

DETAILED DESCRIPTION

Figure 2:
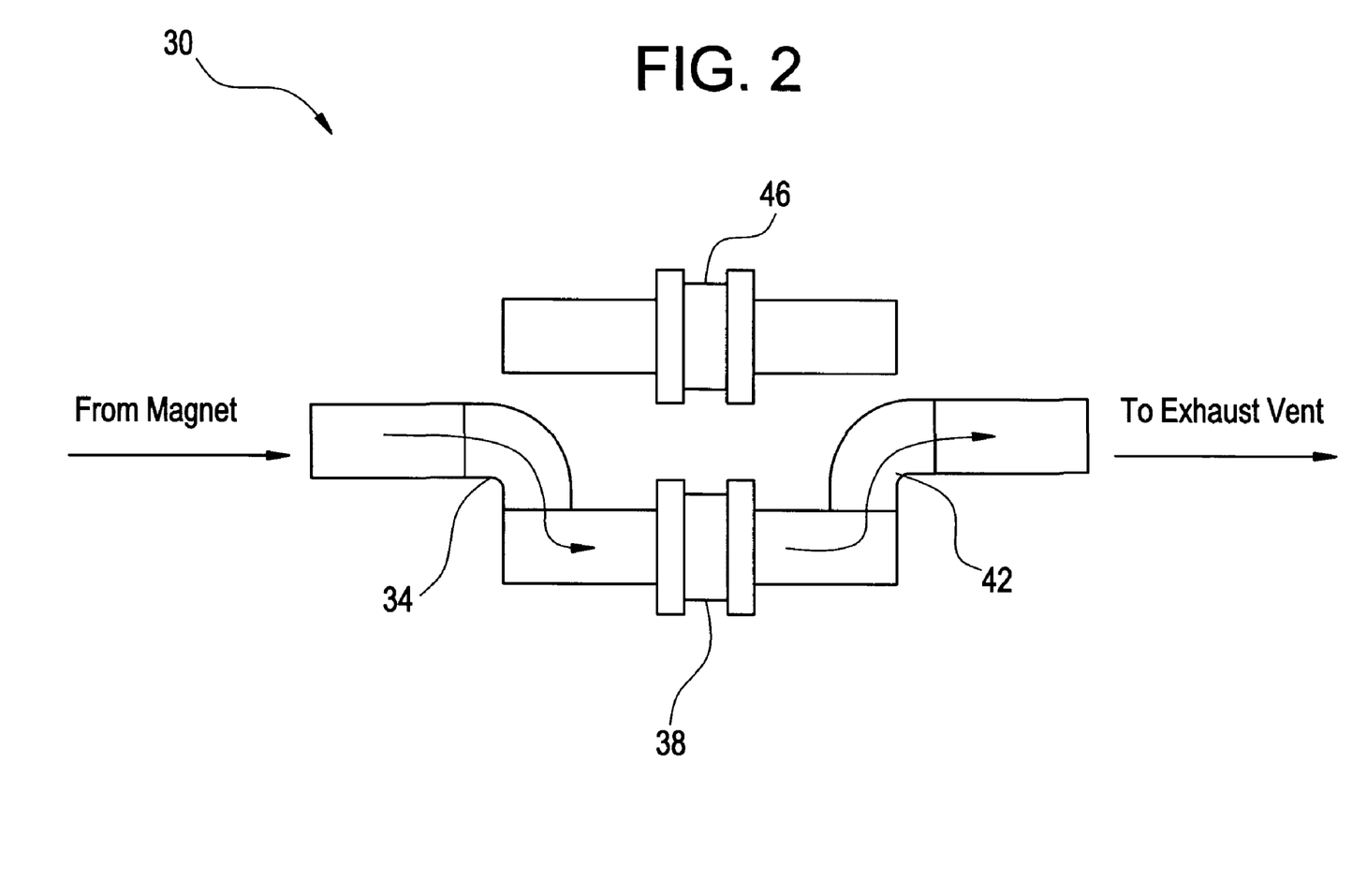
FIG. 2 is a schematic representation of an embodiment of the disclosed magnet vent assembly.

Referring to FIG. 2, one embodiment 30 of a disclosed magnet vent assembly for an MRI system is shown. In this embodiment there are two possible paths for the cryogenic gas to take from the magnet to the exhaust vent, however, other embodiments may include 3 or more flow paths. A first path is shown through a first valve 34, a first burst disc 38 and a second valve 42. There is a second burst disc 46, but the valves are closed off in FIG. 2 to the second burst disc 46. The first burst disc may require replacement due to a variety of reasons, including but not limited to: scheduled replacement, ruptured burst disc, or damaged burst disc. In order to prevent an accidental release of cryogenic gas from the vicinity of the first burst disc during its replacement, or because the first burst disc is damaged, the flow path may be redirected or switched to travel through the second burst disc 46.

Figure 3:
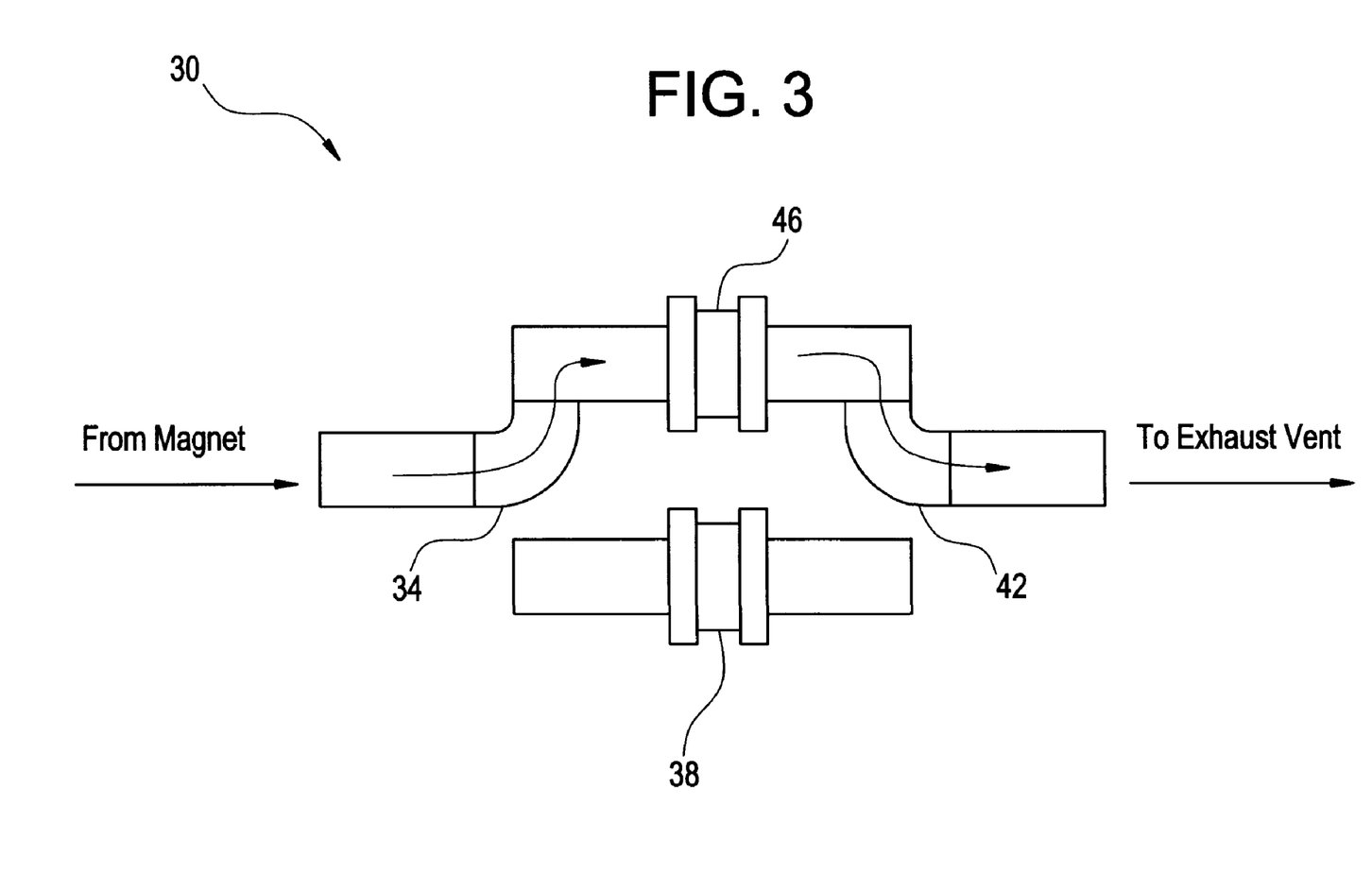
FIG. 3 is a schematic representation of the embodiment of the disclosed magnet vent assembly from FIG. 2, where the flow path is directed to another burst disc.
Figure 4:
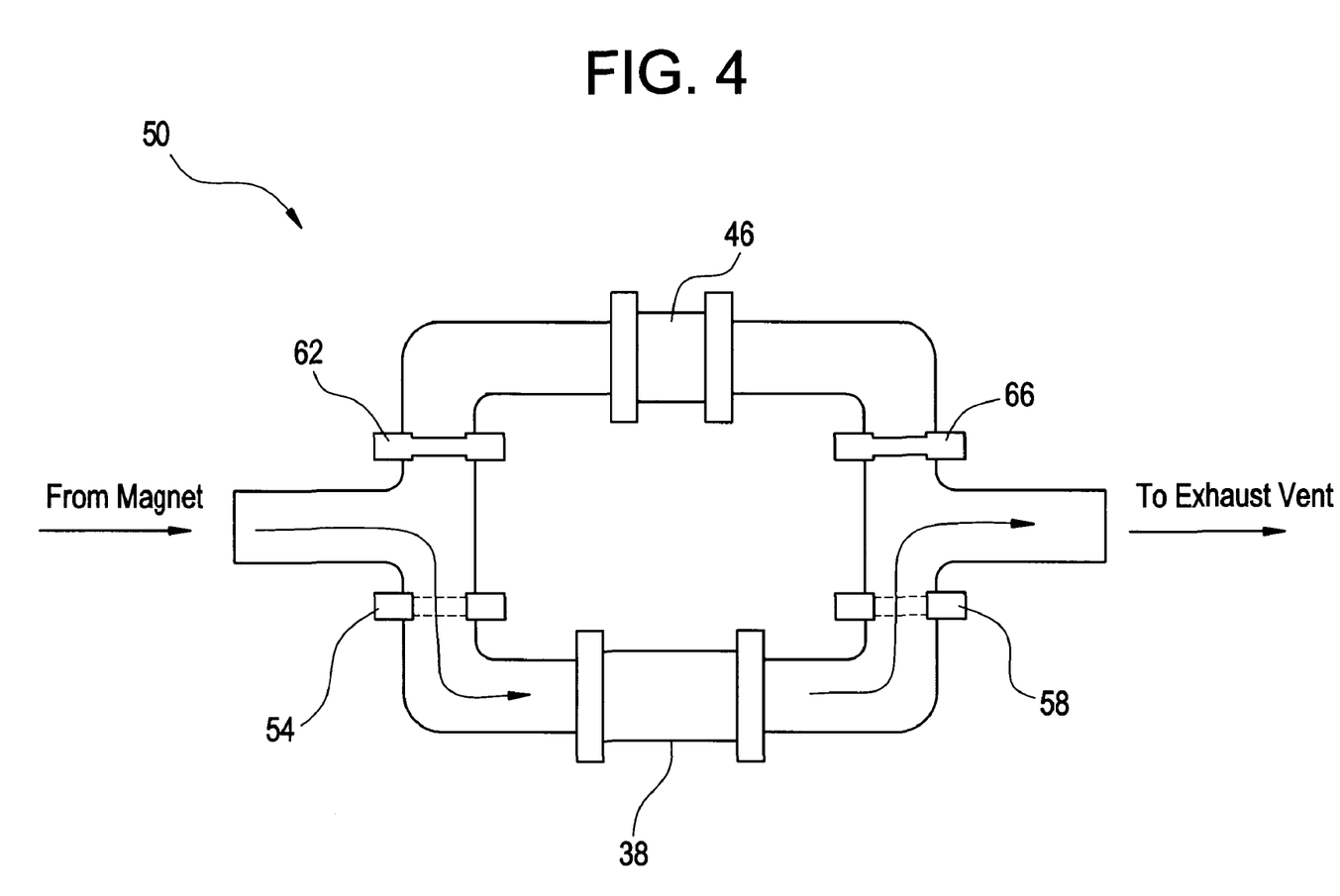
FIG. 4 is a schematic representation of another embodiment of the disclosed magnet vent assembly.

FIG. 3 shows the magnet vent assembly 30 of FIG. 2, but with the flow path directed through the second burst disc 46. The valves 34, 42 have been positioned to block the flow path from the first burst disc 38, and redirect the flow path through the second burst disc. In this state, a service engineer may replace the first burst disc 38, and in the event of a cryogenic gas release event, there will be no cryogenic gas escaping from the vicinity of the first burst disc 38, but rather, the cryogenic gas will be directed through the second burst disc 46 and out to an exhaust vent. The valves 34, 42 may be selected from one or more of the following, but not limited to: 3-port valves, butterfly valves, ball valves, and vane valves. Referring to FIG. 4, another embodiment 50 of the disclosed magnet vent assembly is shown. In this embodiment 50 a combination of gate valves is used, but as discussed above, a variety of other valve types may be used. Thus for two flow paths, each through one of either a first burst disc 38 or a second burst disc 46, a total of at least four gate valves would be used. As shown in FIG. 4, gate valves 54 and 58 are shown in an open arrangement, with gate valves 62 and 66 shown in a closed arrangement, thus the flow path is directed through the first burst disc 38. Therefore, in order to replace burst disc 38, gate valves 62 and 66 would be opened, and then gate valves 54 and 58 would be closed, thereby directing the flow path through the second burst disc 46.

Figure 5:
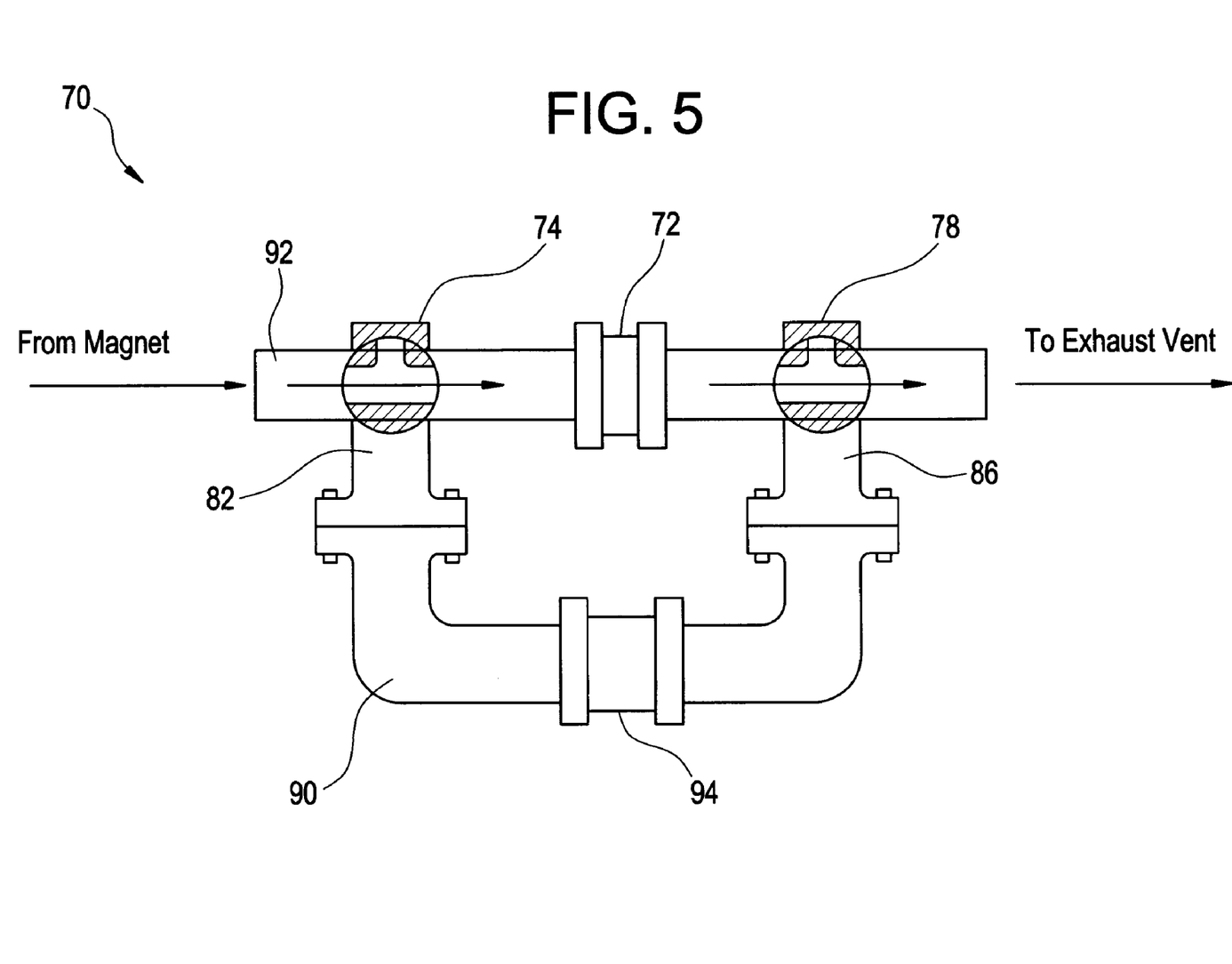
FIG. 5 is a schematic representation of another embodiment of the disclosed magnet vent assembly.
Figure 6:
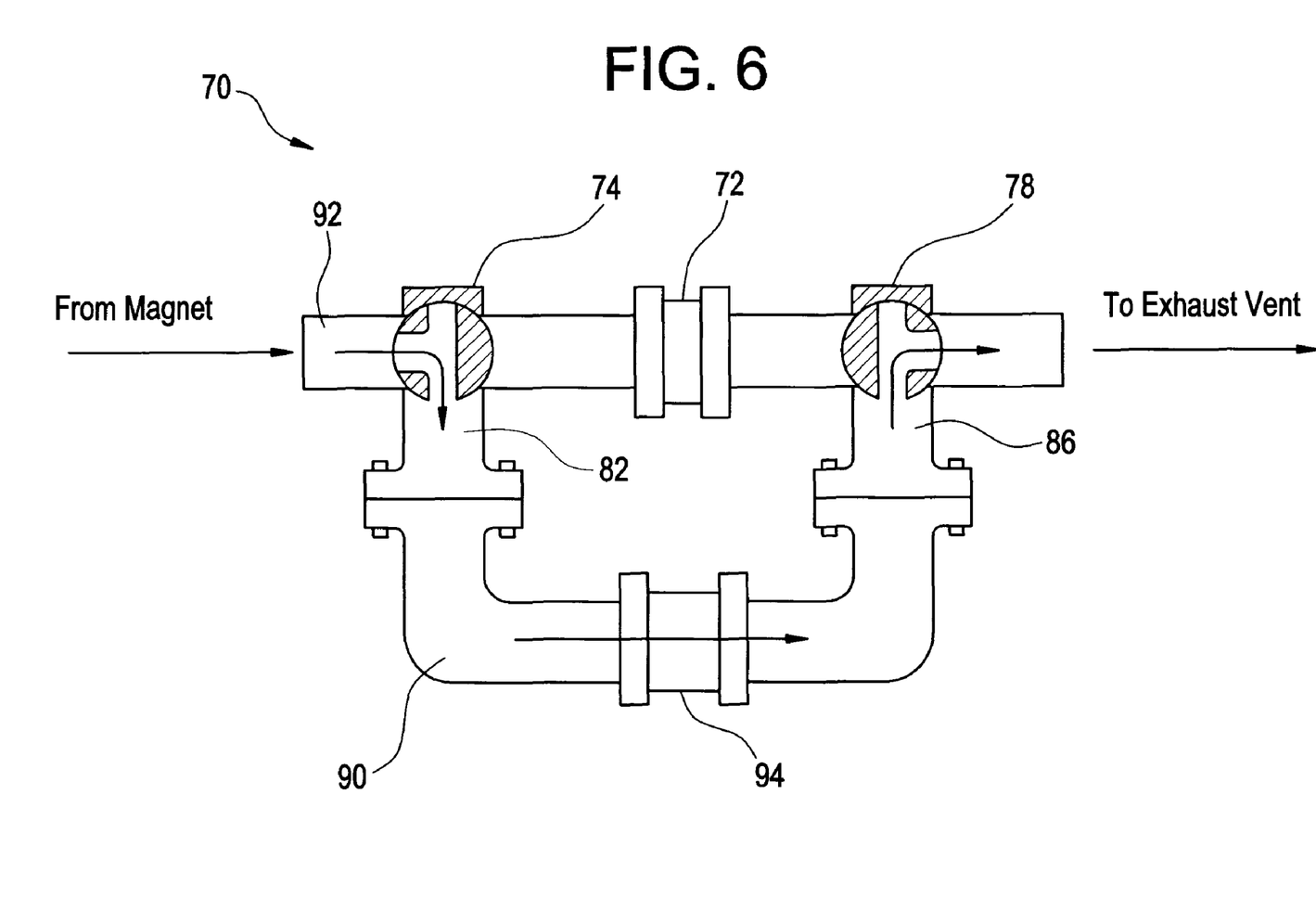
FIG. 6 is a schematic representation of the embodiment of the disclosed magnet vent assembly from FIG. 5, where the flow path is directed to the burst disc in a service tool.

FIG. 5 shows another embodiment 70 of the disclosed magnet vent assembly. In this embodiment, a service tool 90 is put in operable communication with a magnet vent assembly 92 of an MRI system via the connectors 82, 86 The method of attachment may be by, but not limited to, bolting the service tool 90 to the assembly 92, mating threaded connectors, and clamping the tool 90 to the assembly 92. Thus the connectors 82, 86 may include components such as flanges, threaded member, and many other types of mating pieces. In FIG. 5, valves 74, 78 are positioned to direct the flow path through the burst disc 72 of the magnet vent assembly 92 of the MRI system. In FIG. 6, the valves 74, 78 are positioned to block the flow path from the burst disc 72 of the magnet vent assembly 92 of the MRI system, and to direct the flow path through the burst disc 94 of the service tool 90. Thus, the burst disc 72 may be replaced while the magnet is energized, without the possible release of a cryogenic gas in the vicinity of the burst disc 72.

In a typical magnet vent assembly for an MRI system, pressure ratings for the valves may range from 1 atmosphere up to 2 atmospheres. However, if higher pressures are required, then higher pressure rated valves may be used.

Figure 7:
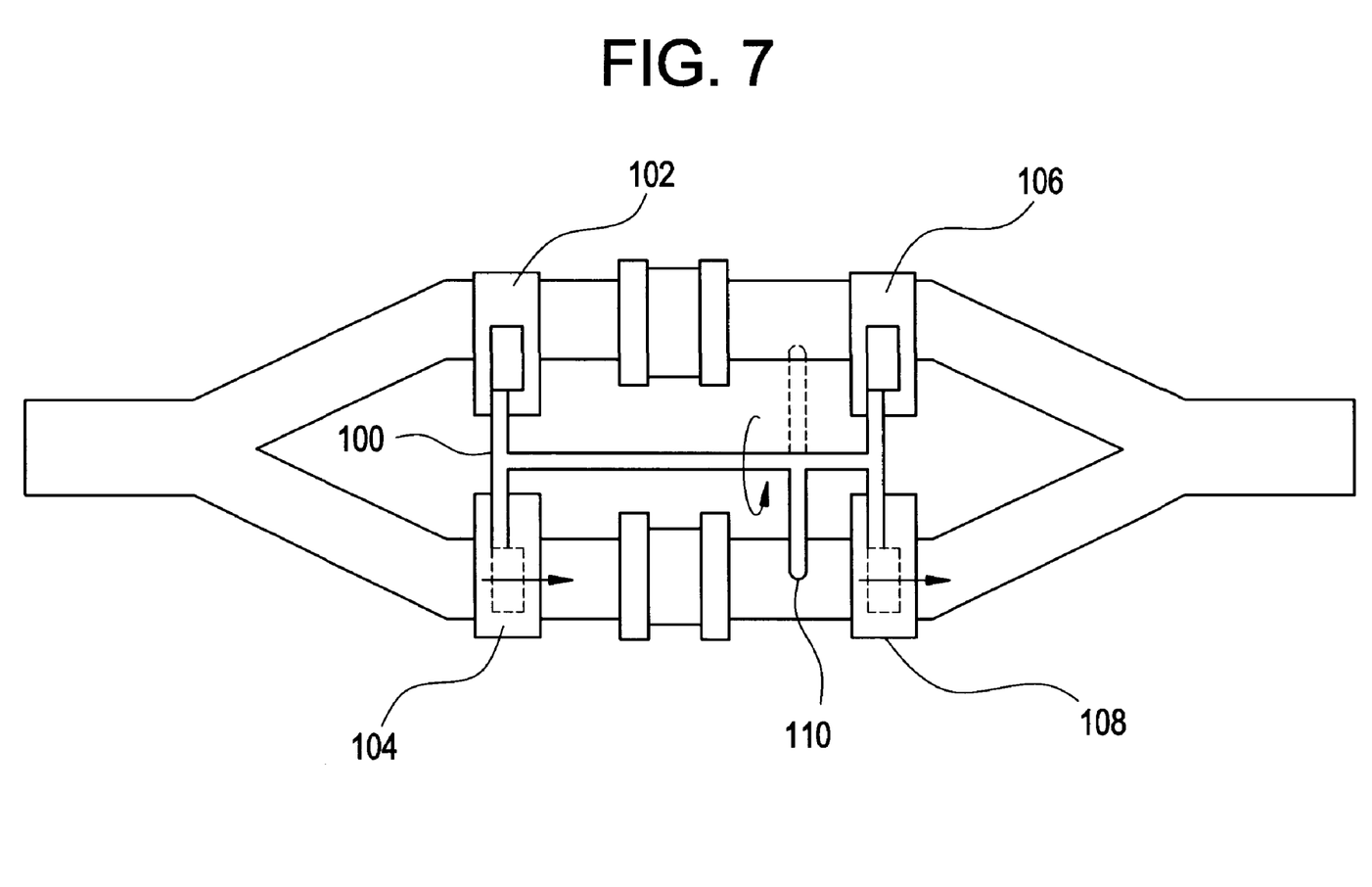
FIG. 7 is a schematic representation of another embodiment of the disclosed magnet vent assembly.

The inclusion of the valves along the flow path of the Including valves in the vent lines gives the possibility that one or more valves may be left in a position which prevents the cryogenic gas from having a flow path to the exhaust vent which may lead to unanticipated release of the cryogenic gas, or damage to the MRI system due to excessively high cryogenic gas pressures. Therefore referring to FIG. 7 a mechanical linkage 100 is shown coupling the valves 102, 104, 106 and 108. Thus as the handle 110 is pulled down, valves 104 and 108 are opened while valves 102 and 106 are simultaneously closed. Thus the mechanical linkage 100 constrains all the valves 102, 104, 106, 108 to act simultaneously. The linkage shown in FIG. 7 need not necessarily be the only type of linkage used for the disclosed apparatus, other known linkage systems, including non-mechanical linkages, may be used. Such linkage systems may include, but are not limited to: gear linkages, electronically controlled linkages, and magnetic linkages.

Figure 8:
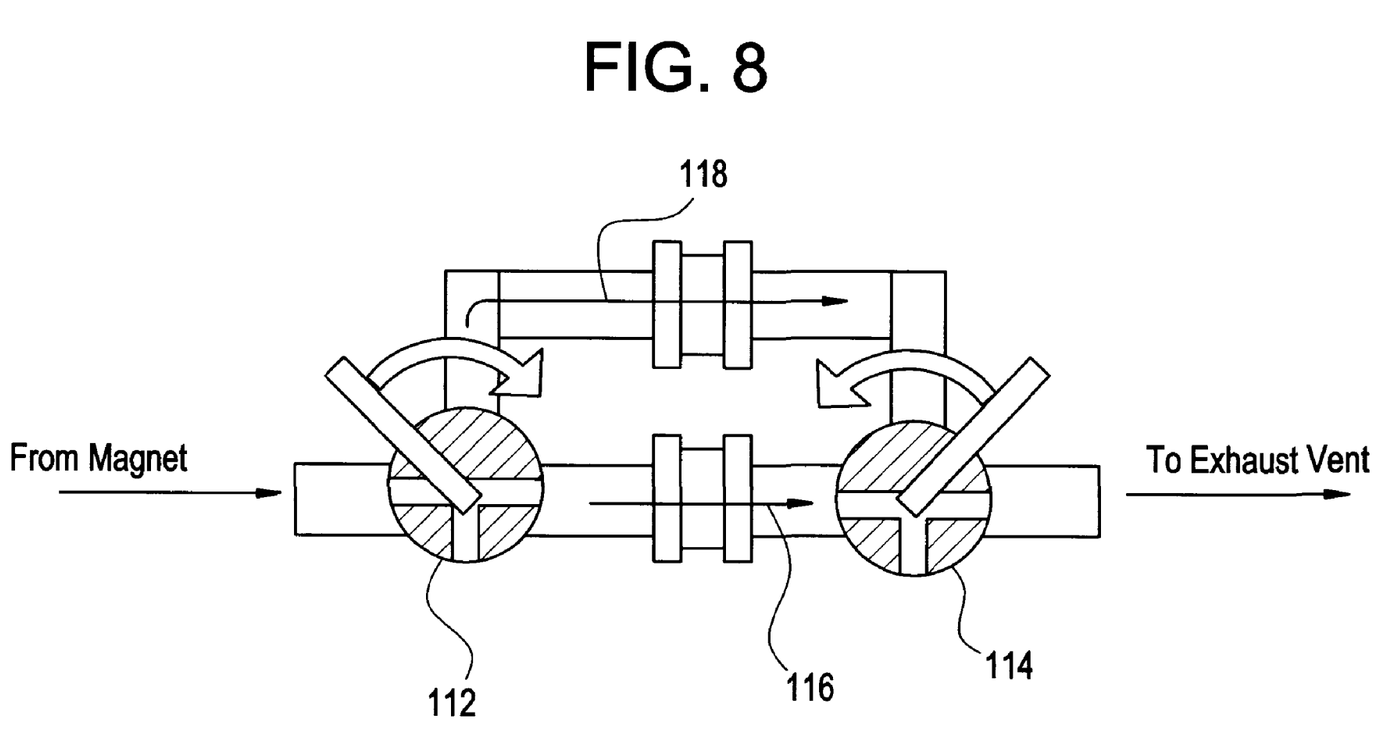
FIG. 8 is a schematic representation of another embodiment of the disclosed magnet vent assembly.

FIG. 8 shows another embodiment of the disclosed apparatus. In this embodiment, the valves 112, 114 are mechanically interlocked, such that when valve handle 112 is turned clockwise, valve handle must simultaneously turn counter-clockwise, thereby changing the flow path from a first flow path represented by the arrow 116, to the second flow path, represented by the arrow 118. The mechanical interlock may be an interlocking gear on associated with each valve 112, 114, a mechanical linkage between the valves, an electronic interlock, or a magnetic interlock.

In an other embodiment of the disclosed apparatus, a plurality of valve sensors may be in communication with a warning system, wherein audible and/or visual alarm warnings may issue if the valves are positioned such that the cryogenic gas does not have a proper flow path to the exhaust vent. Additionally, alarm warnings may issue if the valve sensors detect an attempt at performing maintenance or replacement on a valve that is still in the flow path of cryogenic gas. The warning system may also be configured to automatically place the magnet vent assembly in a failsafe mode, wherein the valves are automatically and/or electronically positioned to provide a flow path to vent.

The disclosed apparatus allows for the replacement of a first burst disc while the magnet of an MRI system remains energized. This avoids the release of cryogenic gas from around the burst disc that is being replaced, and allows a field engineer to replace the burst disc without having to wear bulky and expensive protective gear. Additionally, the disclosed apparatus may prevent the improper blocking of a flow path to vent for the cryogenic gas.

The use of ordinal numbers such as "first" and "second" and so on, herein, are meant to be illustrative only, and is not meant to convey any numerical order to components thusly described.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A magnet vent assembly for venting a cryogenic gas from a superconducting magnet of an MRI system comprising a magnet exhaust and an exhaust vent, the assembly comprising:
    a first burst disc comprisinig a first inlet and a first outlet;
    a second burst disc comprising a second inlet coupled to the first inlet, and a second outlet coupled to the first outlet;
    a first valve in operable communication with the magnet exhaust, the first burst disc, and the second burst disc; and
    a second valve in operable communication with the exhaust vent, the first burst disc, and the second burst disc;
    wherein the first valve is configured to switchably direct a flow path of cryogenic gas from the magnet exhaust through either of the following: the first burst disc and the second burst disc; and wherein the second valve is configured to switchably direct a flow path of cryogenic gas to the exhaust vent from either of the following: the first burst disc and the second burst disc;
    wherein the first valve and second valve are linked to prevent the blockage of a flow path of the cryogenic gas to the exhaust vent.

2. The magnet vent assembly of claim 1, wherein the first valve and second valve are interlocked to prevent the blockage of a flow path of the cryogenic gas to the exhaust vent.

3. The magnet vent assembly of claim 1, wherein the valves are 3-port valves.

4. The magnet vent assembly of claim 1, wherein the valves are ball valves.

5. The magnet vent assembly of claim 1, wherein the valves are vane valves.

6. The magnet vent assembly of claim 1, wherein the valves are able to withstand pressure of greater than about 2 atmospheres.

7. The magnet vent assembly of claim 1, wherein the valves are able to withstand pressure of greater than about 1 atmospheres.

8. The magnet vent assembly of claim 1, further comprising:
    a magnet exhaust;
    an exhaust vent;
    a first valve in operable communication with the magnet exhaust and the first inlet;
    a second valve in operable communication with the exhaust vent and first outlet;
    a third valve in operable communication with the magnet exhaust and the second inlet;
    a fourth valve in operable communication with the exhaust vent and second outlet; and
    wherein the first, second, third and fourth valves are configured to switchably direct a flow path of cryogenic gas from the magnet exhaust through either of the following: the first burst disc and the second burst disc.

9. The magnet vent assembly of claim 8, wherein the first, second, third and fourth valves are linked to prevent the blockage of a flow path of the cryogenic gas to the exhaust vent.

10. The magnet vent assembly of claim 8, wherein the first, second, third and fourth valves are interlocked to prevent the blockage of a flow path of the cryogenic gas to the exhaust vent.

11. The magnet vent assembly of claim 8, wherein the valves are gate valves.

12. The magnet vent assembly of claim 8, wherein the valves are able to withstand pressure of greater than about 2 atmospheres.

13. The magnet vent assembly of claim 8, wherein the valves are able to withstand pressure of greater than about 1 atmospheres.

14. A magnet vent assembly for venting a cryogenic gas from a superconducting magnet of an MRI system, the assembly comprising:
    a first burst disc, the first burst disc comprising a first inlet and a first outlet;
    the first inlet comprising an inlet valve;
    the first outlet comprising an outlet valve;
    an inlet flange in operable communication with the first inlet;
    an outlet flange in operable communication with the first outlet; and
    wherein the magnet vent assembly is configured for a removable attachment by a service tool, the service tool comprising a second burst disc, and the inlet valve and outlet valve are configured to switchably direct a flow path of cryogenic gas through either of the following: the first burst disc and the second burst disc.

15. The magnet vent assembly of claim 14, wherein the valves are 3-port valves.

16. The magnet vent assembly of claim 14, wherein the valves are ball valves.

17. The magnet vent assembly of claim 14, wherein the valves are vane valves.

18. The magnet vent assembly of claim 14, wherein the valves are able to withstand pressure of greater than about 2 atmospheres.

19. The magnet vent assembly of claim 14, wherein the valves are able to withstand pressure of greater than about 1 atmospheres.

20. The magnet vent assembly of claim 14, wherein the inlet and outlet valves are linked to prevent the blockage of a flow path of the cryogenic gas to the exhaust vent.

21. The magnet vent assembly of claim 14, wherein the inlet and outlet valves are interlocked to prevent the blockage of a flow path of the cryogenic gas to the exhaust vent.

22. A service tool for a magnet vent assembly for venting a cryogenic gas from a superconducting magnet of an MRI system, the magnet vent assembly comprising a first burst disc, the service tool comprising:
    an inlet end, configured to be removeably attachable to an inlet flange of a magnet vent assembly;
    an outlet end, configured to be removeably attachable to an outlet flange of a magnet vent assembly;
    a second burst disc in operable communication with the inlet end and outlet end; and
    wherein the service tool is configured to switchable direct a flow path of cryogenic gas through either of the following: the first burst disc and the second burst disc.

23. An MRI system comprising:
    a cryostat;
    a superconducting magnet located in the cryostat;

a first burst disc, the first burst disc comprising a first inlet and a first outlet, and the first inlet is in fluid communication with the cryostat;

a second burst disc, the second burst disc comprising a second inlet coupled to the first inlet and a second outlet coupled to the first outlet, and the second inlet is in fluid communication with the cryostat;

a vent in fluid communication with the first outlet and the second outlet; and means to switchably direct a flow path of cryogenic gas through either of the following: the first burst disc and the second burst disc;

wherein the means to switchably direct a flow path also prevents blockage of the directed flow path to the vent in fluid communication with the coupled first and second outlets.

* * * * *